United States Patent
Kindberg et al.

(10) Patent No.: US 7,243,233 B2
(45) Date of Patent: Jul. 10, 2007

(54) SYSTEM AND METHOD FOR SECURE COMMUNICATION BETWEEN ELECTRONIC DEVICES

(75) Inventors: Timothy Paul James G. Kindberg, Burlingame, CA (US); Kan Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 10/185,293

(22) Filed: Jun. 28, 2002

(65) Prior Publication Data

US 2004/0003250 A1   Jan. 1, 2004

(51) Int. Cl.
- H04L 9/00 (2006.01)
- H04K 1/00 (2006.01)
- H04N 7/167 (2006.01)
- G06Q 99/00 (2006.01)

(52) U.S. Cl. ............... 713/171; 713/153; 705/79; 380/30; 380/247; 380/270

(58) Field of Classification Search ............... 713/171, 713/153; 380/201, 202, 247, 270, 30; 705/79
See application file for complete search history.

(56) References Cited

U.S. PATENT DOCUMENTS

| 5,668,977 | A | | 9/1997 | Swanstrom et al. ........ 395/500 |
| 5,850,444 | A | * | 12/1998 | Rune .................... 713/153 |
| 6,363,139 | B1 | | 3/2002 | Zurek et al. ............... 379/56.1 |
| 2002/0191258 | A1 | * | 12/2002 | Ternullo et al. ............ 359/172 |
| 2005/0035862 | A1 | * | 2/2005 | Wildman et al. ......... 340/573.1 |

* cited by examiner

Primary Examiner—Matthew Smithers
Assistant Examiner—Courtney D. Fields (57) ABSTRACT

A system of securing communications, comprising a plurality of computer peripheral resources, a beacon in signal communication with and located proximate each computer peripheral resource and configured to communicate using RF signals and ultrasound signals, and a portable device configured to request a listing of the computer peripheral resources using wireless network communication and to guide a user to a selected one of the computer peripheral resources using the RF and the ultrasound signals by way of the corresponding beacon, the portable device and the selected computer peripheral resource being configured to exchange encryption keys validated using signals from the beacon and to communicate with each other using encrypted network communication. Also provided is a communication system, comprising first and second portable devices respectively configured to use RF signals and ultrasound signals and to exchange encryption keys and to communicate with each other using encrypted network communication.

2 Claims, 11 Drawing Sheets

SYSTEM AND METHOD FOR SECURE COMMUNICATION BETWEEN ELECTRONIC DEVICES

FIELD OF THE INVENTION

The invention relates to communication between electronic devices. More particularly, the invention relates to locating electronic devices and establishing secure communications between electronic devices.

BACKGROUND OF THE INVENTION

Relatively small and portable microprocessor-based electronic devices have become commonplace. One general type of such device is referred to as a personal digital assistant (PDA). As personal digital assistants have become more robust, people have increased their dependence upon them to carry out numerous personal and business tasks. Typical personal digital assistant applications include: Internet browsing; e-mail correspondence; electronic document editing; time management; etc.

In response, some businesses have added services and resources that cater to personal digital assistant users, including personal digital assistant-accessible printers; use of hubs coupled to the Internet; use of local networks by which users may transfer documents and information between different personal digital assistant devices; etc. A number of such businesses also provide food and beverage service in a lounge-like environment, in an attempt to attract certain groups of personal digital assistant users, particularly business travelers. Businesses of this type are commonly referred to as cyber cafés.

Often, users want their personal digital assistant to communicate with another device (for example, a printer or another user's portable device) in a place such as a cyber café. After identifying and establishing trust in the other device, such users require secure assurance that their personal device is communicating securely with that device (and not some other device).

When a personal digital assistant user enters a place such as a cyber café for the first time (for example, in an airport or unfamiliar city), they may be unaware of the range of personal digital assistant-accessible services that are available. Furthermore, the location of personal digital assistant-accessible resources within the café may be unknown. This can result in wasted time and frustration; especially, for example, if a business-critical document must be printed or an e-mail response to a business proposal needs to be sent quickly.

SUMMARY OF THE INVENTION

The invention provides a system and method for locating selected resources within the area, and conducting secure communications with the selected resources.

One aspect of the invention provides a communication system comprising a plurality of computer peripheral resources, a beacon in signal communication with and located proximate each computer peripheral resource and configured to communicate using RF (radio frequency) signals and ultrasound signals, and a portable device configured to request a listing of computer peripheral resources using a wireless network, e.g. IEEE 802.11, Bluetooth or infrared; the portable device being further configured to guide a user to a selected one of the computer peripheral resources using the RF and the ultrasound signals by way of the beacon coupled to the selected computer peripheral resource, the portable device and the selected computer peripheral resource being configured to exchange encryption keys on the basis of signals from the beacon.

Another aspect of the invention provides a communication system comprising a plurality of computer peripheral resources, a beacon in signal communication with and located proximate each computer peripheral resource and configured to communicate using RF signals and ultrasound signals, and a portable device configured to request a listing of the plurality of computer peripheral resources using wireless signals, the portable device and a computer peripheral resource selected from the listing being configured to exchange encryption with the participation of the beacon by way of validation, and the selected computer peripheral resource and the portable device being configured to communicate with each other using encrypted network communication.

Another aspect of the invention provides a method of using a computer peripheral resource comprising a plurality of computer peripheral resources and beacons and coupling each of the computer peripheral resources in signal communication with one of the beacons, providing a portable device, issuing a wireless discovery request from the portable device to the computer peripheral resources, displaying a listing of the computer peripheral resources using the portable device, responsive to the discovery request, issuing a locate wireless signal from the portable device to a selected one of the computer peripheral resources, issuing guidance signals from the selected computer peripheral resource to the portable device using RF signals and ultrasound signals by way of the beacon coupled to the selected computer peripheral resource, responsive to the locate signal, providing an output display on the portable device to guide a user to the selected computer peripheral resource responsive to the RF signals and the ultrasound signals, exchanging encryption keys between the portable device and the selected computer peripheral resource on the basis of signals from the beacon coupled to the selected computer peripheral resource, and communicating data between the portable device and the selected computer peripheral resource using encrypted wireless signals.

Another aspect of the invention provides a beacon comprising a transceiver configured to transmit and receive RF signals, a transmitter configured to transmit ultrasound signals, and circuitry configured to couple the beacon to a computer-related resource, circuitry configured to provide guidance signals to a portable device using the RF signals and the ultrasound signals, and circuitry configured to participate in the exchange of encryption keys between the portable device and another device using the RF signals, the ultrasound signals.

Still another aspect of the invention provides a portable device comprising a transceiver configured to transmit and receive RF signals, a plurality of receivers respectively configured to receive ultrasound signals, a wireless network interface configured to transmit and receive wireless signals, a display, and circuitry configured to issue a wireless request for a listing of computer-related resources using the wireless network interface, to issue a wireless locate signal using the wireless network interface, and to output guidance information on the display responsive to receiving the RF and ultrasound signals using the transceiver and the plurality of receivers, to cause the portable device to selectively exchange encryption keys with a selected computer-related resource chosen from the listing, and to communicate with the selected computer-related resource using encrypted wireless signals using the wireless network interface.

Another aspect of the invention provides a communication system comprising first and second portable devices respectively configured to transmit and receive RF and ultrasound signals and communicate over a wireless network, wherein the first and second portable devices are further respectively configured to display guidance information used to locate each other using certain of the RF and ultrasound signals, and wherein the first and second portable devices are further respectively configured to exchange encryption keys and to communicate with each other using encrypted wireless communication.

DESCRIPTION OF THE DRAWINGS

FIGS. 8 and 8A provide a flowchart for performing another alternative method of the invention, initiated in FIG. 4.

DETAILED DESCRIPTION OF THE INVENTION

Figure 1:
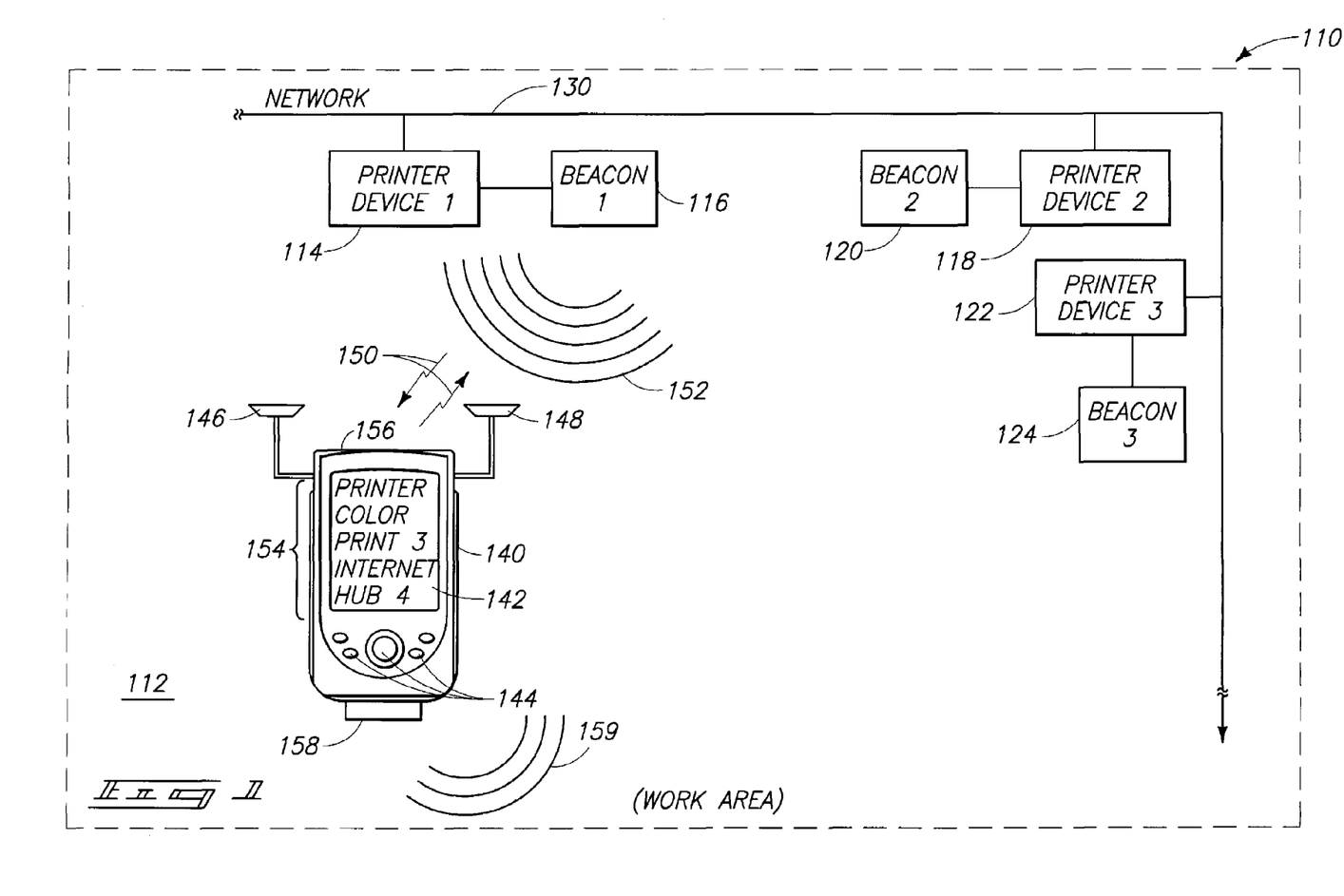
FIG. 1 illustrates a wireless communication system according to one embodiment of the invention.

FIG. 1 provides an illustration of a wireless communication system 110 embodying the invention. The system 110 includes wireless resources work area 112; respective printer devices 114, 118 and 122. The devices 114, 118, and 122 are connected to respective proximally located beacons 116, 120, and 124. The respective connections between devices 114, 118, and 122 and beacons 116, 120 and 124 may be established, for example, using suitable conductive or optical cables and may utilize a USB port, parallel port, optical port, or other connecting point on the corresponding device 114, 118, and 122. The system 110 further includes wireless network interfaces, coupled to devices 114, 118, 122 to define wireless network 130 covering area 112. Network 130 can also be a wired network and connected to a wireless network covering area 112. In an alternative embodiment (not shown), printer devices (or other computer-related resources) and their corresponding beacons may be incorporated into the same housing. Other embodiments of connecting devices and beacons are possible.

Further included in the system 110 are one or more portable wireless devices 140, such as personal digital assistants (PDAs), or handheld computers. The devices 140 can alternatively be mobile phones or any other type of handheld or personal wireless electronic device from which it may be desired to print or communicate with another device or a computer network. Each device 140 includes a display 142; controls 144; respective wireless signal receivers 146 and 148; wireless signal transceiver 156; and wireless network interface 158. The device 140 may include other controls (not shown), such as a pointer and a touch sensitive screen to control the device 140.

The beacons 116, 120, and 124 are independently capable of transmitting wireless signals 150 of a first type, and of transmitting wireless signals 152 of a second type. In the illustrated embodiment, the first type of wireless signals can be, for example, radio frequency RF signals such as those in the 900 MHz band, the 2.4 GHz band, the 5.8 GHz band, or other bands which may be licensed or non-licensed by the FCC, infra-red signals, visible light signals, or other signals. Additionally, in the illustrated embodiment, the second type of wireless signals 152 are ultrasound signals or other signals that can be used for locating a position as described below.

The device 140 is capable of transmitting and receiving wireless signals 150 of the first type by way of corresponding transceiver 156, and of receiving or transmitting wireless signals 152 of the second type by way of receivers 146 and 148 which define a pair of "ears" for direction finding. Two or more receivers are typically provided, symmetrically disposed on either side of the device 140 (or even on the user). The receivers 146 and 148 define a pair. Other configurations of receivers are possible. As described herein, signal 150 represents selective communications by way of wireless RF carrier, while signals 152 represent selective ultrasound transmissions, each having data content specific to the particular context. Other combinations of wireless signal types for wireless signals 150 and 152 are possible.

The device 140 is also capable of communicating with resources on the network 130, such as devices 114, 118, and 122, by way of network interface 158 and wireless communication 159. In the illustrated embodiment, the network 130 can be wireless LANs, such as those based on IEEE 802.11 or Bluetooth standards, or infrared. Any data configured for use within system 110 may be selectively transmitted and received by way of wireless signals 150, 152 and 159, contemporaneously or at different times.

Area 112 is any area providing various resources available for wireless access. Such an area might be located in an airport, in a food-service business (i.e., café), in the business resources center of a hotel, in a museum, in a library, etc. Accessible resources, exemplified by devices 114, 118, and 122 above, may include: printers; plotters; internet access hubs; communications hubs; goods and services ordering stations; etc. Other computer peripheral or computer-accessible devices capable of data communication with the device 140 are also possible. Upon entry to area 112, a user having a device 140 selects a "discovery" request provided on the display 142 using the controls 144.

The device 140 responds by obtaining a listing 154 of available resources in the area 112 using any available means, such as a network discovery protocol by way of wireless signals 159. The device 140 then provides the listing 154 of resources on the display 142.

Figure 2:
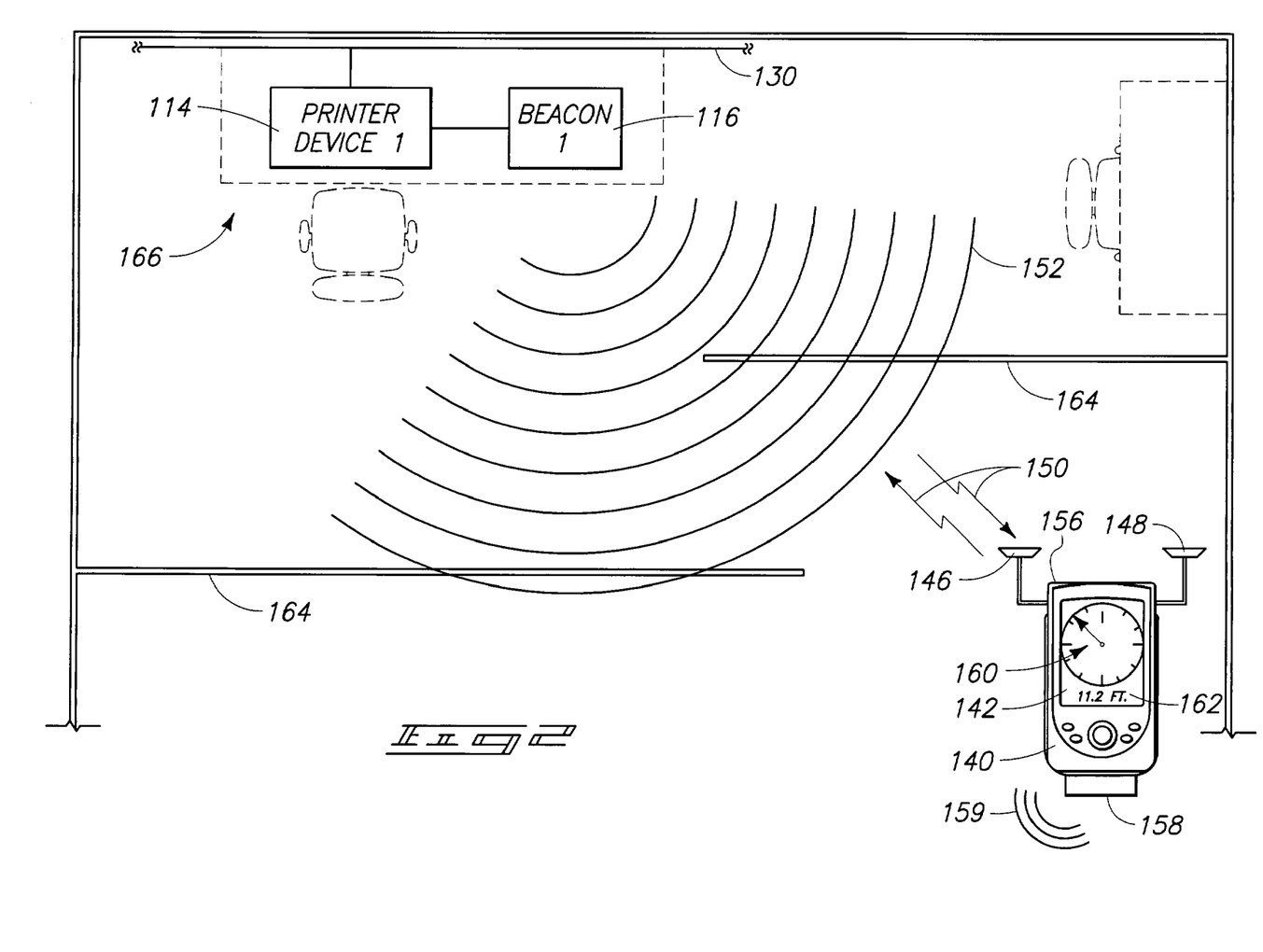
FIG. 2 is a further illustration of a wireless communication system according to one embodiment of the invention.

Referring now to FIG. 2, the user selects printer 114 (shown as PRINTER DEVICE 1) from listing 154 and issues a corresponding "locate" command from the device 140 by way of corresponding wireless network transmission 159. Initially, the user may be obstructed from seeing printer 114 by walls 164. The selected printer 114 responds by issuing both a wireless acknowledgment signal 150 and an ultrasound guidance signal 152 by way of the associated beacon 116, which are received by the device 140 by way of its wireless transceiver 156 and the ultrasound receivers 146 and 148, respectively. In response to guidance signal 152, the device 140 provides a directional indication 160 and range indication 162 on the display 142. The device 140 derives indications 160 and 162 through any of a variety of possible signal processing methods: time-of-flight-differential of signal 152 as compared to wireless signal 150; time-of-arrival-differential of signal 152 at receivers 146 and 148; etc. Other signal processing, derivation, or usage schemes are possible.

Following indications 160 and 162, the user is guided to the printer 114 at location 166. The inventors have recognized that sending a signal over a wireless LAN involves highly variable delays whose order of magnitude may be milliseconds, comparable with ultrasound propagation times. Thus, in the illustrated embodiment, to obtain meaningful distance measurements, the wireless message or signal 150 sent with the ultrasound message or signal 152 is not a wireless LAN (e.g., IEEE 802.11) message, but a type of RF transmission with negligible latency (like the type of RF transmission used to unlock a car door or open a garage door).

Figure 3:
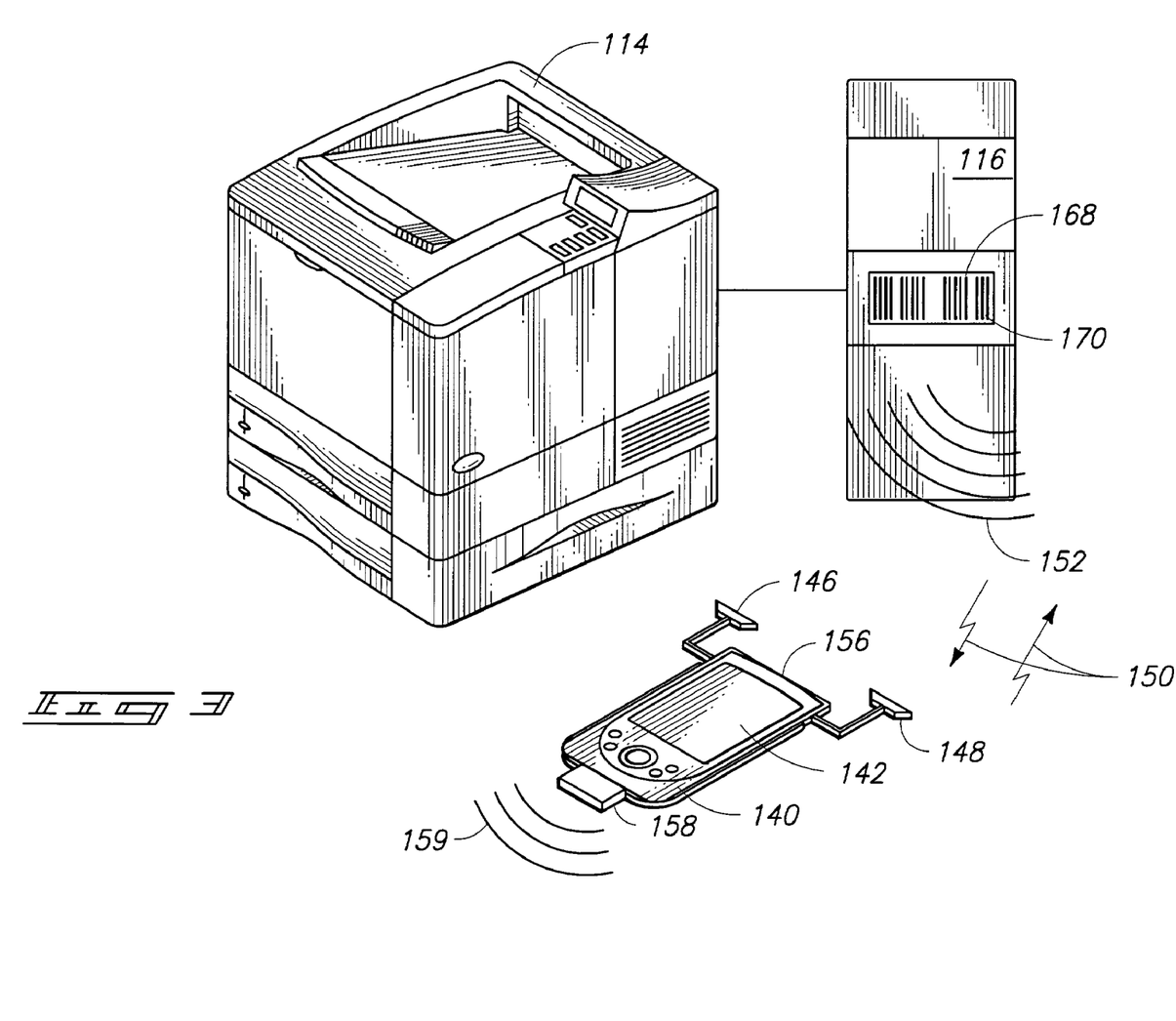
FIG. 3 is yet a further illustration of a wireless communication system according to one embodiment of the invention.

Referring now to FIG. 3, it is assumed that the user has arrived in line of sight with the printer 114. At this point, the user's goal is to establish private communications with the printer 114 through the use of a mutually-agreed encryption key. A number of key exchange schemes can be employed to obtain such an encryption key; therefore, the first of these schemes shall be described, with other embodiments subsequently detailed. The user now points the personal digital assistance 140 at the device 114 and issues an "associate" command by way of wireless signal 159 using the device 140. The device 114 receives the "associate" command and responds by using the beacon 116 to simultaneously transmit a wireless response having a public encryption key Kp and a random number N1, by way of signal 150, and the random number N1 only by way of ultrasound signal 152.

The portable device 140 receives signals 150 and 152, and compares the respectively received random numbers N1 to verify if there is a match. The portable device 140 also verifies if the beacon 116 is substantially in line of sight with device 140 by checking whether near-simultaneous arrival of the ultrasound signal 152 at both receivers 146 and 148 occurred. If the N1 data received does not match or the beacon 116 is not in front of device 140, the user is informed of the verification failure and given the option to re-associate. Otherwise, the device 140 continues by calculating the distance to the beacon 116 by way of signal processing methods previously described, and displaying the result on display 142.

The associated beacon is, in one embodiment, further configured to provide a brief flashing light, beep tone, or similar signal in response to the reception of the "associate" command (and "locate" command) by the user. This provides additional assurance to the user of communication with the desired device.

If the user is confident that the displayed distance reasonably matches that actual distance to the beacon 116, and that, if the beacon is so equipped, light or sound is emanating from the beacon of the required device, then the user issues an "OK" command using the device 140 by wireless signal 159. The OK command includes the number N1, as well as randomly-selected session encryption key K, with K encrypted using public key Kp. The corresponding wireless OK command 159 is received by the device 114, which confirms N1 is valid before proceeding. Assuming that N1 is valid, the device 114 responds by issuing a verification message by way of corresponding wireless signal 159, including a new random number N2, in the sequence: N2, then Kp, then N2 again, with the whole sequence being encrypted using K.

The wireless verification message 159 is received by the device 140, which decrypts the message using K, and confirms that both instances of N2 agree and that Kp is valid. Assuming overall validity, the user is informed that the verification is good by appropriate messaging on display 142. At this point, the mutually agreed encryption key K has been exchanged between the device 140 and the printer 114 and secure communication has been established between them by way of wireless network 159. The user may now proceed to make use of the printer 114 to print documents or graphic images, etc., stored in the device 140.

The preceding description exemplifies one possible embodiment. Other embodiments are possible, with three alternative sequences being outlined in FIGS. 4, 5, 6, 7–7A, 8–8A. The sequences of these embodiments are hereafter described.

Figure 4:
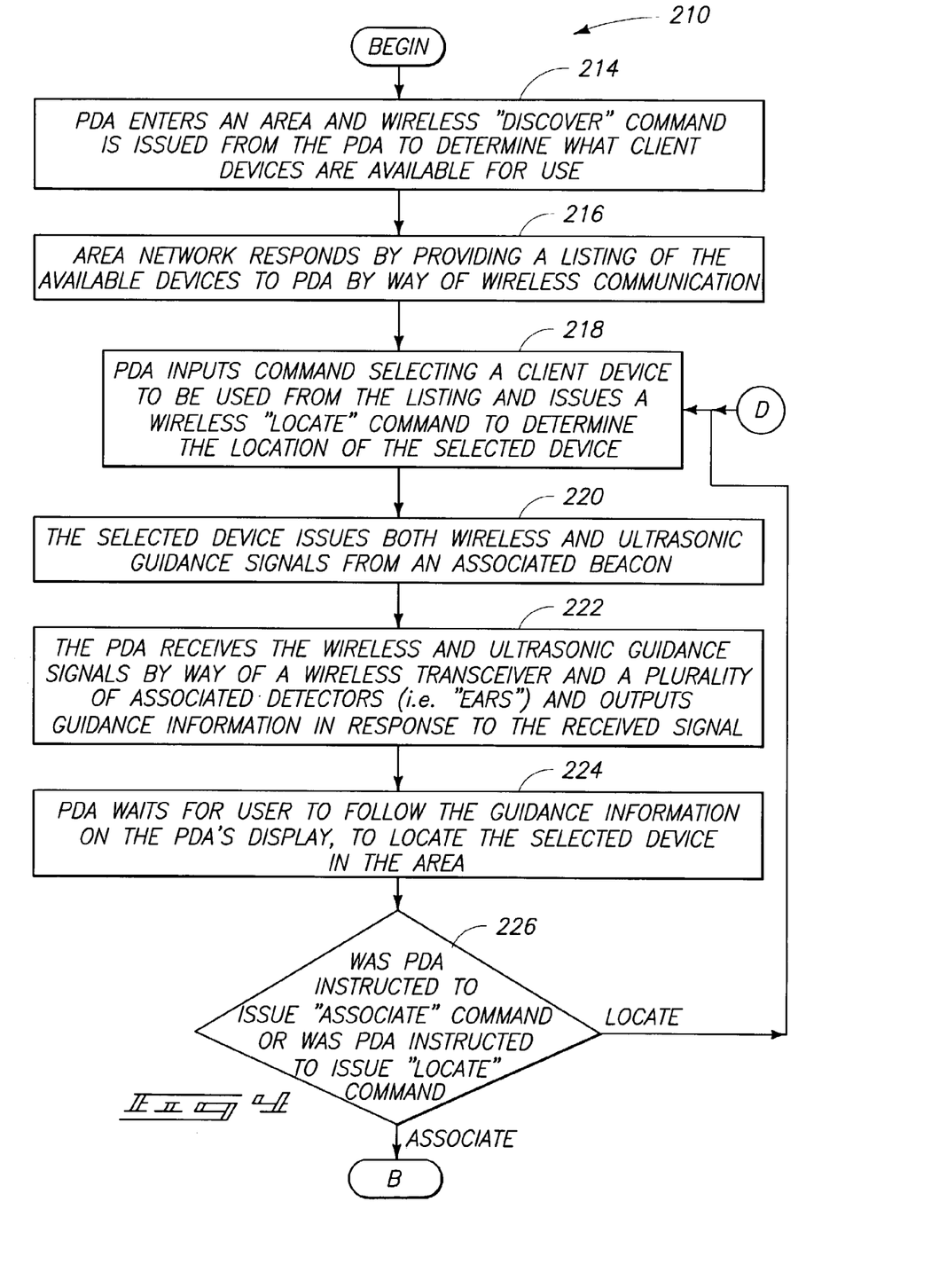
FIG. 4 provides a beginning flowchart for performing one method of the invention.
Figure 5:
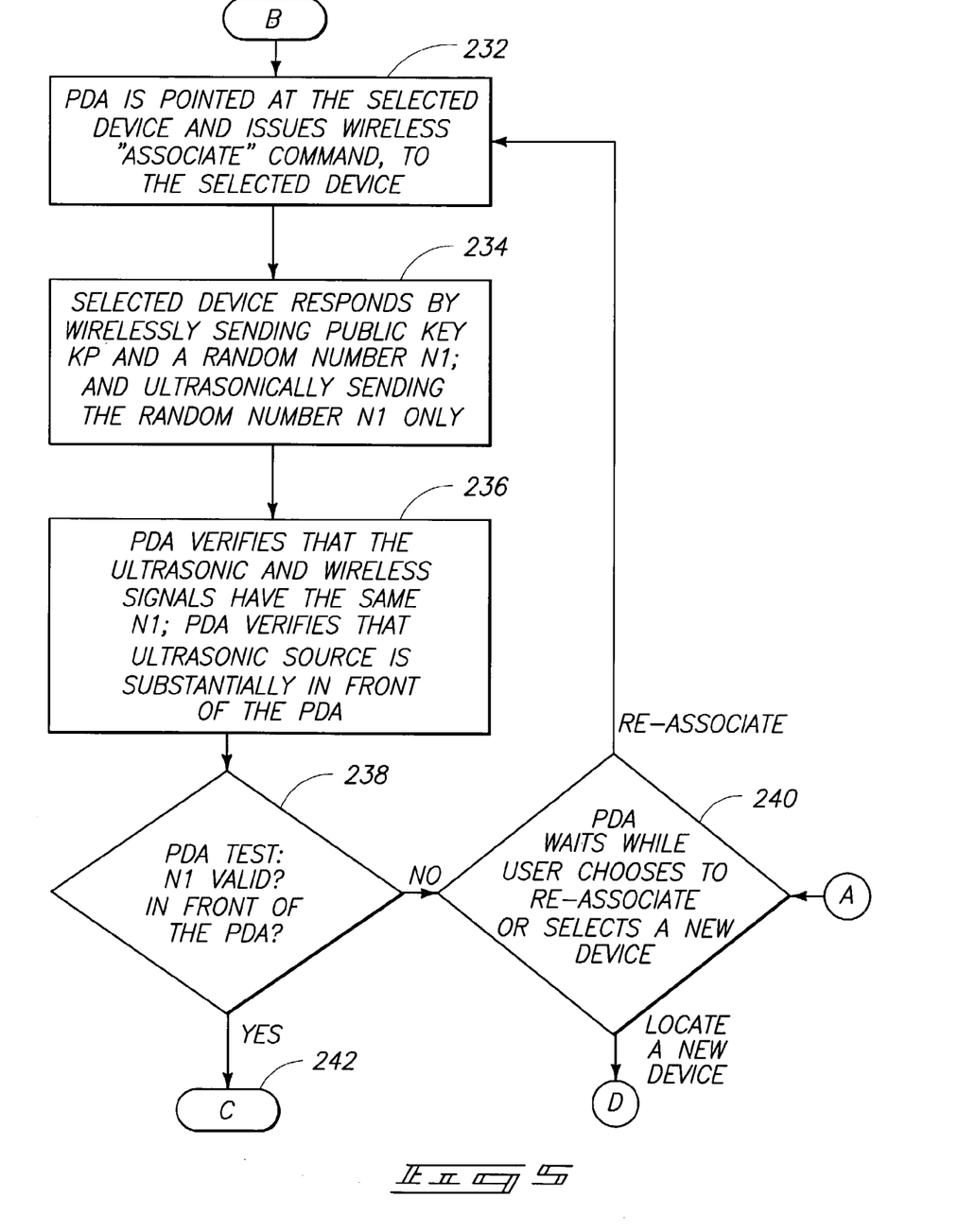
FIG. 5 is a continuation flowchart of the method of FIG. 4.
Figure 6:
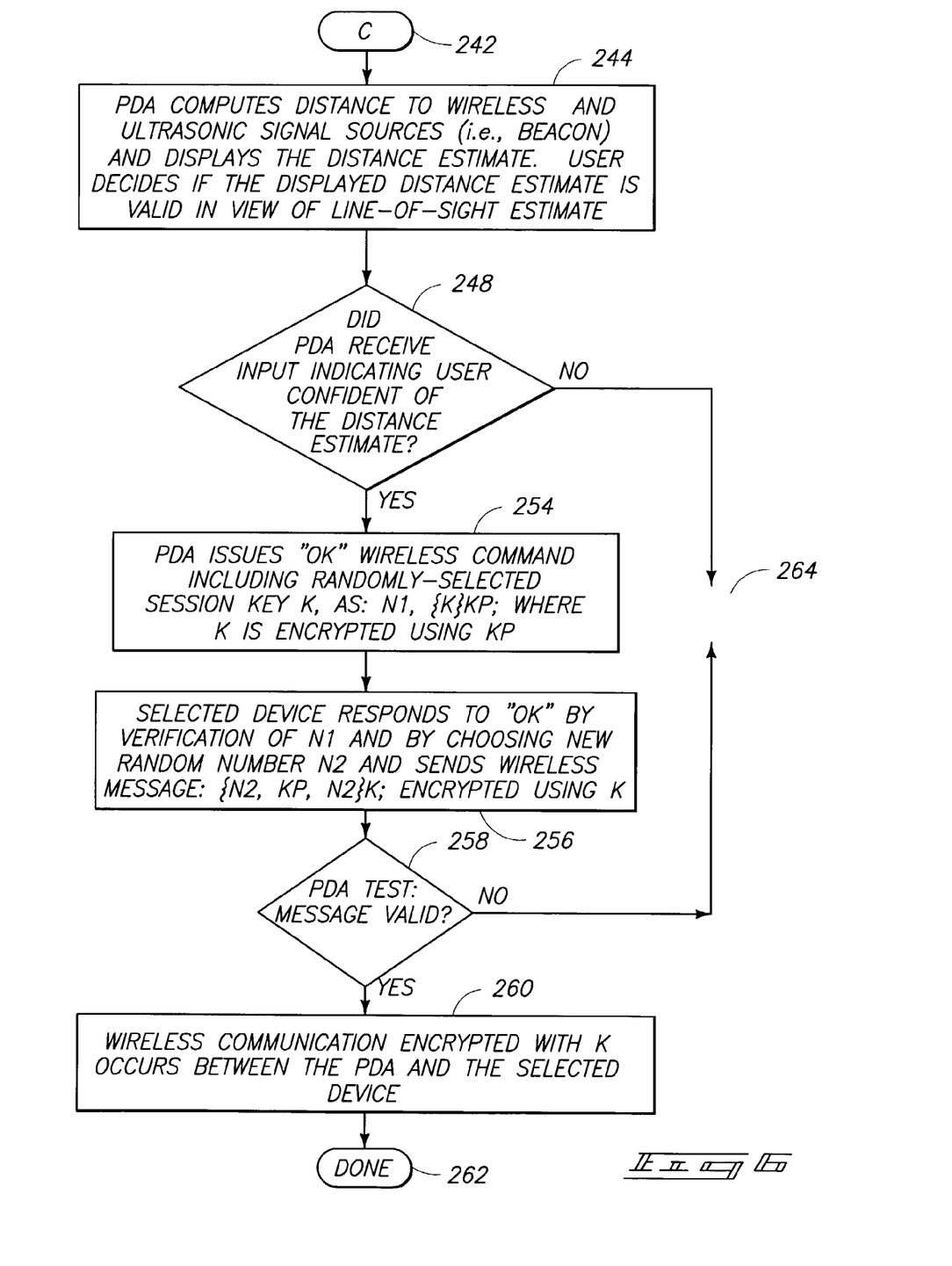
FIG. 6 is a final flowchart of the method of FIG. 4.

FIGS. 4, 5 and 6 are flowcharts illustrating steps performed by the system 110 in accordance with a first embodiment 210.

In step 214, a user having a device 140 enters a wireless resources area. The user causes the device 140 to issue a wireless 'discovery' command to determine what resources (i.e., client devices) are available for use by way of wireless signal 159.

In step 216, the area network 130 responds by transmission of a list 154 of devices that the user may choose from. This listing is provided on the display of the device 140.

Next, in step 218, the portable device inputs a device selection from the listing and issues a wireless "locate" command, which is received by the selected device via the area network 130.

In step 220, the selected device responds to the "locate" command by causing the beacon associated with the selected device to issue both wireless and ultrasound guidance signals 150 and 152.

In step 222, the device 140 receives both the wireless and ultrasound signals by way of the wireless transceiver 156 and attached ultrasound receiving apparatus 146 and 148. In response to the wireless and ultrasound guidance signals, the device 140 provides direction 160 and range 162 indications to the user on the assistant's display 142.

In step 224, the device 140 waits for the user to follow the guidance indications 160 and 162 to locate the selected device. The associated beacon is, in one embodiment, further configured to provide a brief flashing light, beep tone, or similar signal in response to the reception of the "locate" command by the user. This provides additional assurance to the user that the selected device has now been found. After the user has indicated to the device 140 that the selected device has been located, the device 140 continues to step 232. If the user reissues the "locate" command by way of the device 140, the device 140 returns to step 218. The determination to "associate" or to "locate" is illustrated in step 226.

In step 232, the device 140 is pointed at the selected device and issues an "associate" command to the selected device by way of signal 159, in response to a corresponding input from the user.

Next, in step 234, the selected device responds to the associate command by simultaneous transmission of wireless and ultrasound verification messages, by way of the associated beacon (in addition to providing a brief flashing light, beep tone, or similar signal, if the beacon is so equipped). The wireless verification consists of a public encryption key Kp, as well as a random number N1. The ultrasound verification consists of number N1 only.

In step 236, the device 140 receives the wireless and ultrasound verification signals 150 and 152.

In step 238, the device 140 determines whether the selected device is substantially in line of sight with device 140 by verifying near-simultaneous arrival of the ultrasound signal 152 at both receivers 146 and 148 occurred, and verifies that N1 is the same within both received signals 150 and 152. If either the near-simultaneous arrival did not occur or the same N1 was not received, the verification is deemed invalid and process 210 continues at step 240. A valid verification results in continuation of process 210 at step 244 by way of connector 242.

In step 240, the device 140 gets user input on whether to re-associate or select a different device from the list 154 to locate. After performing step 240, the device 140 proceeds to step 232 or 218 depending on the user choice.

Referring now to FIG. 6, in step 244 the device 140 outputs to the user that the N1 number test was found to be valid and the received signals emanate from a point in line of sight with the user, and indicates the calculated distance to the beacon as a result of the verification signals 150 and 152.

In step 248, the device 140 receives an input indicating whether or not the user decided if the verification is good, by comparing the distance indication on the portable device to a visual estimate. If so, the device 140 moves on to step 254. If not, then the device 140 continues to step 240, in which the device 140 waits for the user to re-associate or to choose a new device from the list 154 to locate.

In step 254, the device 140 randomly determines a session encryption key K, and issues a wireless "OK" message to the selected device by way of signal 159, including random number N1, and the session key K, which has been encrypted using the public key Kp.

In step 256, the selected device tests that N1 is the same as in the wireless verification message sent in step 234 and responds to the OK message by generating a new random number N2 and by sending a final confirmation network message 159 in the format: N2, then Kp, then N2 again, all encrypted using K.

In step 258, the device 140 receives and decrypts the final confirmation network message, and tests the message for validity by comparing both instances of N2 and by verifying Kp. If the steps are not valid, the device 140 proceeds to step 240.

In step 260, the device 140 outputs that the validity test was successful and may proceed with encrypted communications using session key K with the selected device via the network, to, for example, print documents, access e-mail or the Internet, etc. IEEE 802.11 or any other suitable protocol may be used during the encrypted communication. When the user indicates to the device 140 that the user is done, the association is ended in step 262.

Figure 7:
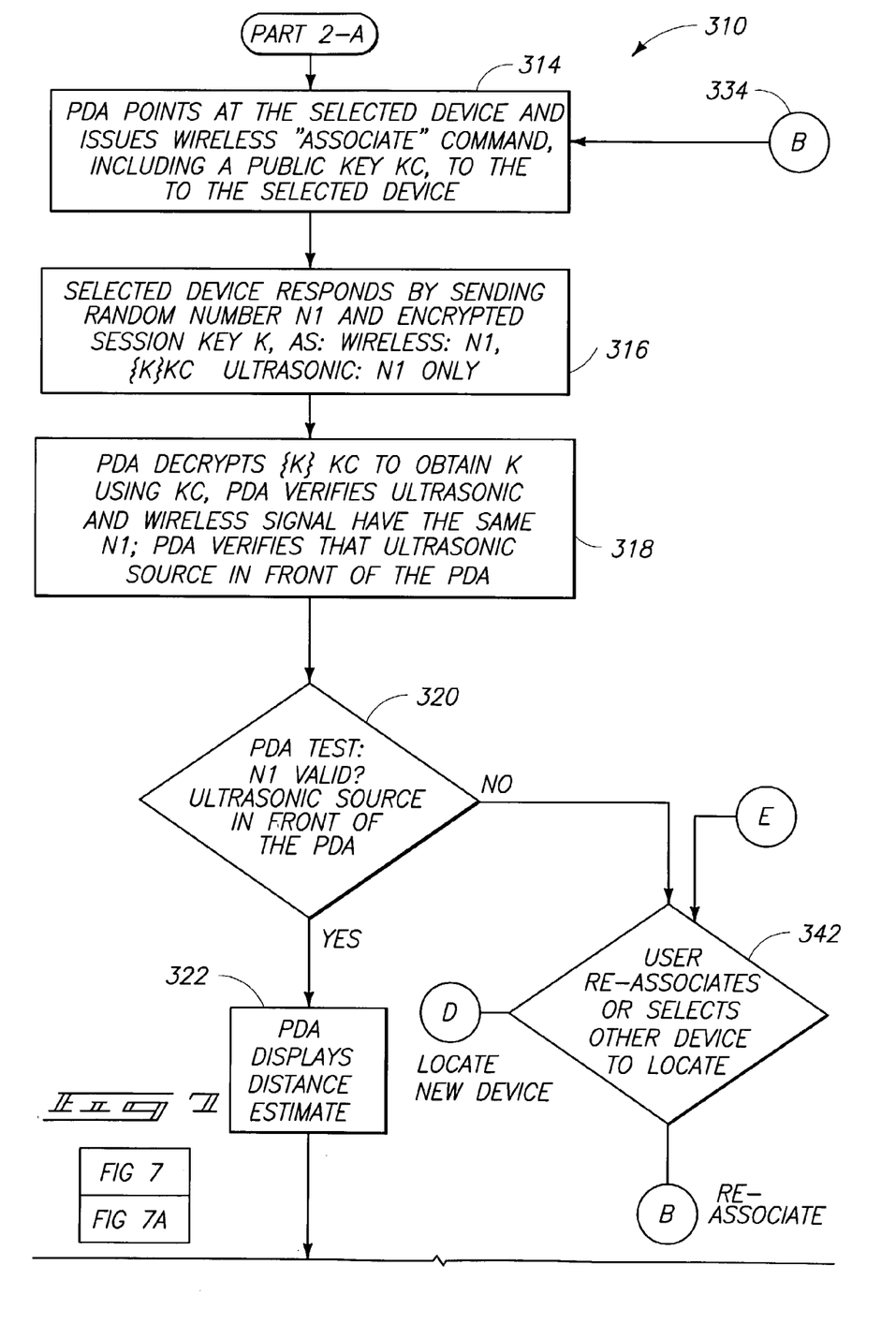
FIGS. 7 and 7A provide a flowchart for performing an alternative method of the invention, initiated in FIG. 4.
Figure 7A:
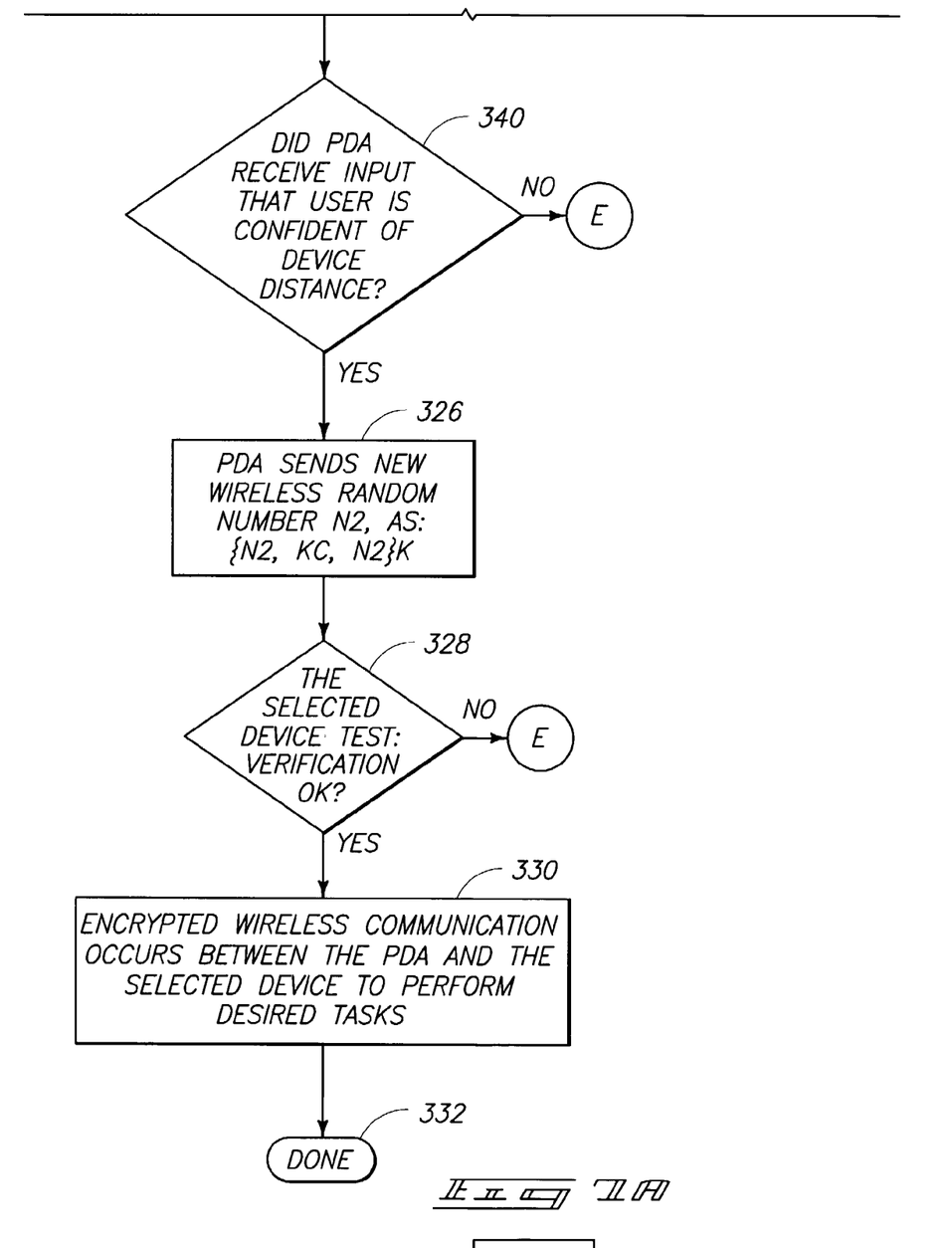

FIGS. 7 and 7A illustrate logic performed by the device 140 in accordance with an alternative embodiment. In step 314, the device 140 is pointed at the selected device and issues a wireless "associate" command to the selected device by way of signal 159, which includes a public key Kc.

In step 316, the selected device responds to reception of the associate command by determining a random number N1, and a session encryption key K. The selected device then issues a wireless response signal 150 having N1, and key K encrypted using Kc, simultaneous with the ultrasound issuance 152 of the number N1.

In step 318, the device 140 receives the wireless and ultrasound signals, and decrypts the message to obtain encryption key K. The device 140 verifies that the selected device is in line of sight with device 140 by confirming near-simultaneous arrival of the ultrasound signal occurred at both receivers 146 and 148 and verifies that the same N1 was received by both of the wireless 150 and ultrasound 152 signals.

In step 320, if either the near simultaneous arrival did not occur or the same N1 was not received, the device 140 proceeds to step 342. Otherwise, the device 140 outputs to the user that the tests are good and proceeds to step 322.

In step 322, the device 140 displays the calculated distance to the signals' source, and then proceeds to step 340.

In step 340, the user inputs to device 140 whether or not the displayed distance estimate to the selected device is acceptable. If so, then the device proceeds to step 326. If not, then the device 140 proceeds to step 342.

In step 342, the user inputs to the device 140 as to whether to re-associate or to select another device from the listing 154 to locate. The device 140 then proceeds either to step 314 or to step 218 based upon the input.

At step 326, the device 140 determines a new random number N2, and sends a wireless verification message by way of signal 159 in the format: N2, then Kc, then N2 again, all encrypted using key K.

In step 328, the selected device receives and decrypts the wireless verification message using key K. If both instances of N2 match, and Kc is valid, then a wireless final confirmation is sent to the device 140 affirming this validity, and process 310 proceeds to step 330. If the selected device determines that the verification request is invalid, the selected device informs the device 140 by way of signal 159 and the device 140 proceeds to step 342.

In step 330, the device 140 may proceed with encrypted communications using exchanged session key K with the selected device, to accomplish tasks such as printing documents, accessing e-mail or the Internet, etc. When the user is done, the association is ended in step 332.

Figure 8A:
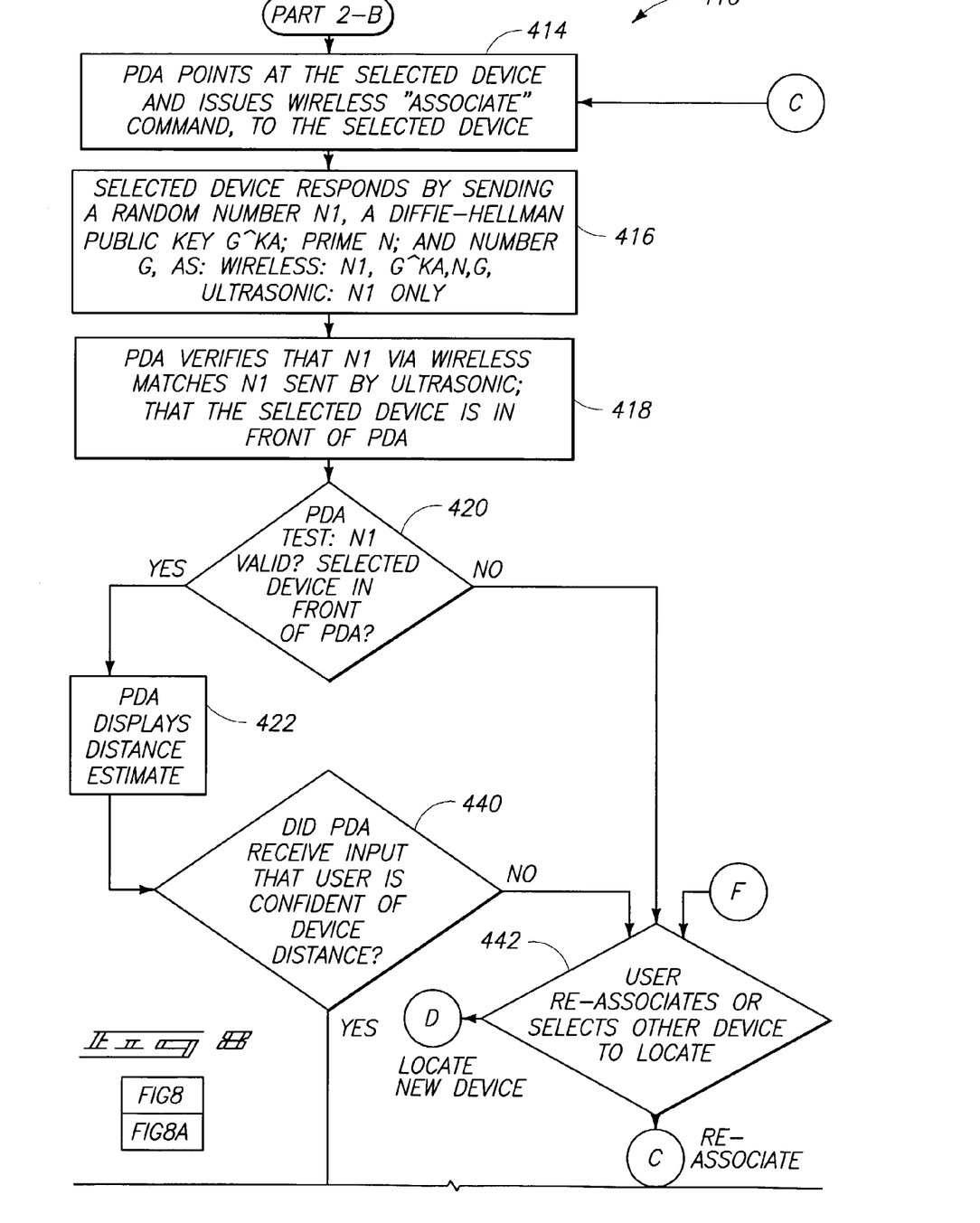

FIGS. 8 and 8A illustrate logic performed by the device 140 in accordance with another embodiment. In step 414, the device 140 issues a wireless "associate" command to the selected device by way of signal 159.

In step 416, the selected device responds to the wireless associate command by generating a random number KA as a Diffie-Hellman private key, a large prime n, a number g such that g is primitive mod n, a Diffie-Hellman public key of the form $g^{KA}$ mod n, and a random number N1. The selected device then issues a wireless signal 150 including N1, $g^{KA}$ mod n, n, and g, simultaneous with issuing the number N1 by way of ultrasound signal 152.

In step 418, the device 140 receives the wireless and ultrasound signals from step 416. The device 140 verifies that the same N1 was received by both of the wireless 150 and ultrasound 152 signals, and verifies that the selected device is in line of sight with the device 140 by confirming that near-simultaneous arrival of ultrasound signal 152 at both receivers 146 and 148 occurred.

In step 420, if either the near-simultaneous arrival did not occur or the same N1 was not received, the device 140 proceeds to step 442. Otherwise, the device 140 outputs to the user that the tests are good and proceeds to step 422.

In step 422, the device 140 displays the calculated distance to the signals source, and then proceeds to step 440.

In step 440, the user inputs to the device 140 whether or not the displayed distance estimate is judged to be valid. If so, then the device 140 proceeds to step 424. If not, then the device proceeds to step 442.

In step 442, the user inputs to the device 140 whether to re-associate or selects another device from the listing 154 to locate. The device 140 then proceeds on to step 414 or to step 218 responsive to the input.

In step 424, the device 140 randomly determines a new Diffie-Hellman private key KB, and issues a wireless confirmation message consisting of N1 and $g^{KB}$ mod n to the selected device by way of signal 159.

In step 428, the selected device responds by randomly choosing a number N2 and sending a wireless verification message consisting of: N2, then $g^{KA}$ mod n, then $g^{KB}$ mod n, and then N2 again, with the entire message encrypted using key $g^{KAKB}$ mod n, to the device 140 by way of signal 159.

In step 430, the device 140 receives and decrypts the verification message using the key $g^{KAKB}$ mod n. If both instances of N2 match, and $g^{KA}$ mod n and $g^{KB}$ mod n are valid, then the device 140 proceeds to step 432. Otherwise, the device 140 proceeds to step 442.

In step 432, the device 140 may proceed with encrypted communications using key $g^{KAKB}$ mod n with the selected device, to accomplish any number of tasks such as, for example, printing documents, accessing e-mail or the Internet, etc. When communications are completed, the association is ended in step 434.

Figure 9:
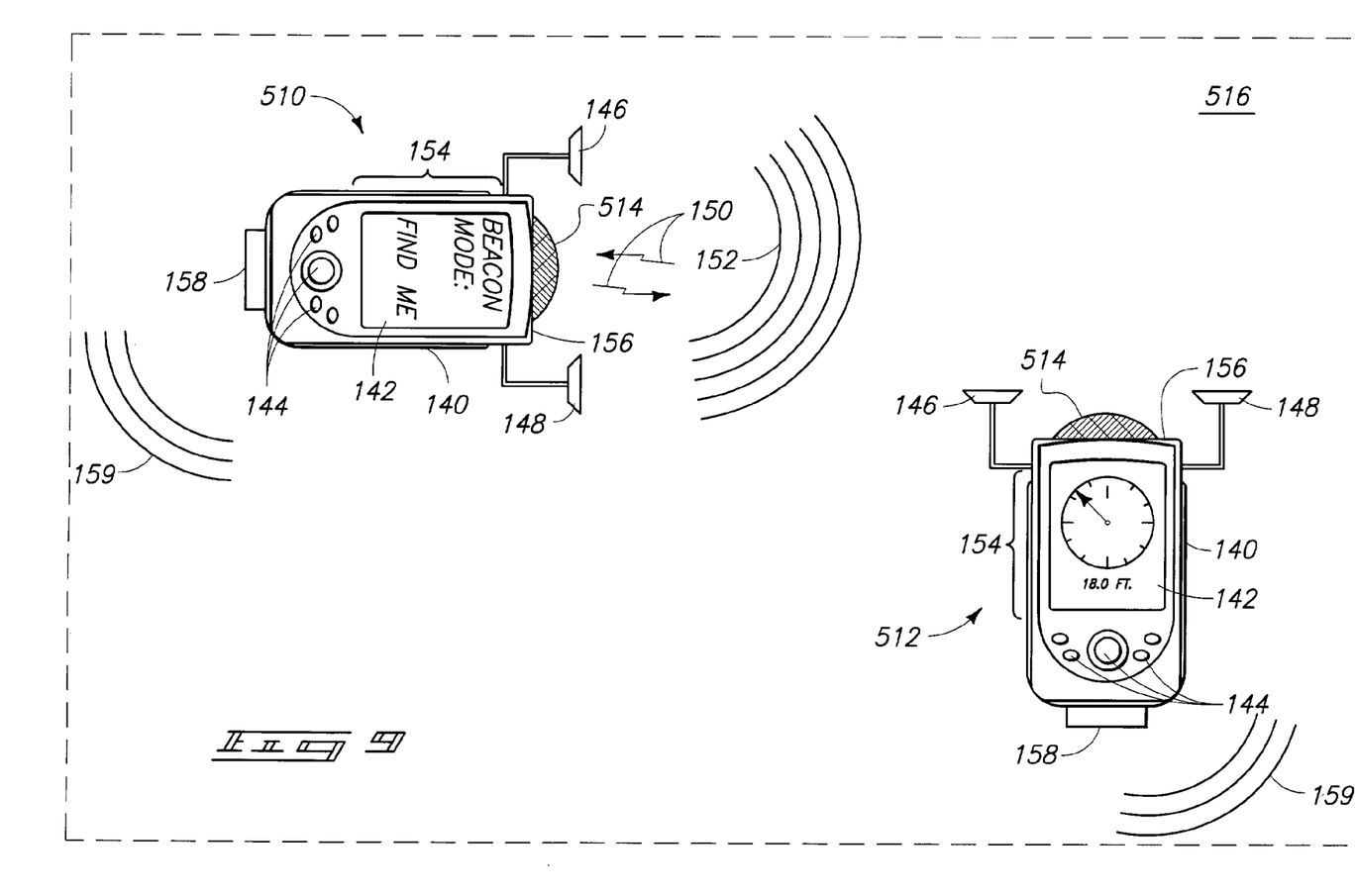
FIG. 9 is another illustration of a wireless communication system according to one embodiment of the invention.

FIG. 9 illustrates an embodiment of the invention for providing secured communication between two portable devices 140, respectively designated as digital devices 510 and 512. Each of the digital devices 510 and 512 comprise portable devices 140, having display 142; controls 144; ultrasound receivers 146 and 148 for receiving signals 152, and RF transceiver 156 for signals 150. In another embodiment, a different number of ultrasound receivers (for example, three) may be included on each digital device.

Each of the digital devices 510 and 512 further comprise an ultrasound transmitter 514 for signals 152 and a wireless network interface 158 capable of transmitting and receiving wireless signal 159. Using elements 146, 148, 156, 158 and 514, and signals 150, 152 and 159, the digital devices 510 and 512 may be used to locate one another within an area 516 and to establish encrypted wireless communications via signal 159 by way of any logical method similar to those previously described and illustrated in FIGS. 4, 5, 6, 7–7A, and 8–8A.

For example, as illustrated in FIG. 9, digital device 510 is operating in a beacon mode and is providing the wireless and ultrasound guidance signals 150 and 152, respectively. The digital device 512 receives the guidance signals 150 and 152 and provides distance and direction information corresponding thereto on display 142 of portable device 140. A user may follow the guidance information display 142 on the digital device 512 to locate the digital device 510. Thereafter, a session encryption key may be established for subsequent use in encrypted wireless communications between the digital devices 510 and 512, using any suitable logical sequence similar to those previously described. Additionally, IEEE 802.11 protocol or another suitable protocol may be employed during any subsequent encrypted wireless communications between the digital devices 510 and 512.

Referring again to FIG. 3, yet another embodiment is provided. In the embodiment of FIG. 3, beacon 116 includes a display 168. After the user locates the selected printer 114, located in close proximity to the beacon 116, the issuance of a wireless "associate" command by the device 140 results in the display of a barcode 170 on the display 168 of the beacon 116. The user may then use the device 140 to gather the session encryption key through scanning (not shown) and interpretation of the barcode 170. Because scanning the barcode 170 requires holding the device 140 in relatively close proximity to the display 168, typically in the range of about 1–12 inches, it is very difficult for another user to interfere or intercept the barcode without the legitimate user's knowledge. This makes barcode encryption key exchange fast and very secure. The barcode 170 can be displayed on devices other than the beacon 116, e.g., an independent display device connected to printer 114 or even on printer 114 itself.

In compliance with the statute, the invention has been described in language more or less specific as to structural and methodical features. It is understood, however, that the invention is not limited to the specific features shown and described, since the means herein disclosed comprise forms of putting the invention into effect. The invention is, therefore, claimed in any of its forms or modifications within the proper scope of the appended claims appropriately interpreted in accordance with the doctrine of equivalents.

What is claimed is:

1. A system, comprising:
   device that is accessible via a local network;
   beacon located with the device;
   portable device that establishes secure communication with the device by using the beacon to determine a session encryption key for communicating with the device via the local network wherein the beacon includes a display and the portable device determines the session encryption key by scanning a barcode on the display.

2. A method for establishing secure communication between a device on a local network and a portable device, comprising:
   transmitting a set of signals from a location of the device;
   determining a session encryption key for communication between the portable device and the device via the local network in response to the signals wherein determining a session encryption key comprises scanning a barcode on a display at the location.

* * * * *